United States Patent
Barthel et al.

(10) Patent No.: US 6,448,527 B1
(45) Date of Patent: Sep. 10, 2002

(54) HIGH-STRENGTH EROSION ELECTRODE

(75) Inventors: Bernd Barthel; Heinrich Groos, both of Herborn; Hans Hermanni, Sinn-Fleisbach; Klaus Tauber, Biebertal, all of (DE)

(73) Assignee: Berkenhoff GmbH, Heuchelheim (DE)

( * ) Notice: Subject to any disclaimer, the term of this patent is extended or adjusted under 35 U.S.C. 154(b) by 0 days.

(21) Appl. No.: 09/202,221
(22) PCT Filed: Aug. 22, 1997
(86) PCT No.: PCT/EP97/04595
§ 371 (c)(1),
(2), (4) Date: Dec. 9, 1998
(87) PCT Pub. No.: WO98/09764
PCT Pub. Date: Mar. 12, 1998

(30) Foreign Application Priority Data

Sep. 4, 1996 (DE) .......................... 196 35 775

(51) Int. Cl.⁷ .............. B23H 1/04; B23H 1/06
(52) U.S. Cl. ................ 219/69.15; 219/69.17; 219/69.11; 219/69.12
(58) Field of Search ............. 219/69.15, 69.17, 219/69.11, 69.12; 428/941, 924, 607, 615, 655, 668, 671

(56) References Cited

U.S. PATENT DOCUMENTS 4,287,404 A * 9/1981 Convers et al. .......... 219/69 W
4,686,153 A * 8/1987 Tominaga et al. .......... 428/610
4,935,594 A * 6/1990 Groos et al. ............. 219/69.12
4,988,552 A * 1/1991 Tomalin .................... 428/677

FOREIGN PATENT DOCUMENTS

EP  0 185 492   6/1986

OTHER PUBLICATIONS

ASM Metals Handbook ninth edition vol. 1 p. 125, 1980.*
"Fachkunde Fuer Metallverarbeitende Berufe" by A. Leyensetter 1949 (p. 221).
Patent Abstracts of Japan M–509 Aug. 21, 1986, vol. 10/No. 242 JP–61–71925.

* cited by examiner

*Primary Examiner*—M. Alexandra Elve
(74) *Attorney, Agent, or Firm*—Flynn, Thiel, Boutell & Tanis, P.C.

(57) ABSTRACT

The invention concerns a high-strength erosion electrode having good electrical conductivity. The erosion electrode is made up of a steel core, an intermediate layer of copper or a copper-containing alloy, and an outer layer containing at least 40 % zinc. The steel core has a patented structure which contains between 0.6 and 1 wt. % carbon and occupies an area corresponding to between 50 and 75 % of the erosion electrode diameter, the intermediate layer occupying an area of between 5 and 40 % of the total diameter, the outer layer occupying an area of between 10 and 30 %, and the zinc content of the outer layer being between 40 and 60 wt. %.

18 Claims, 1 Drawing Sheet

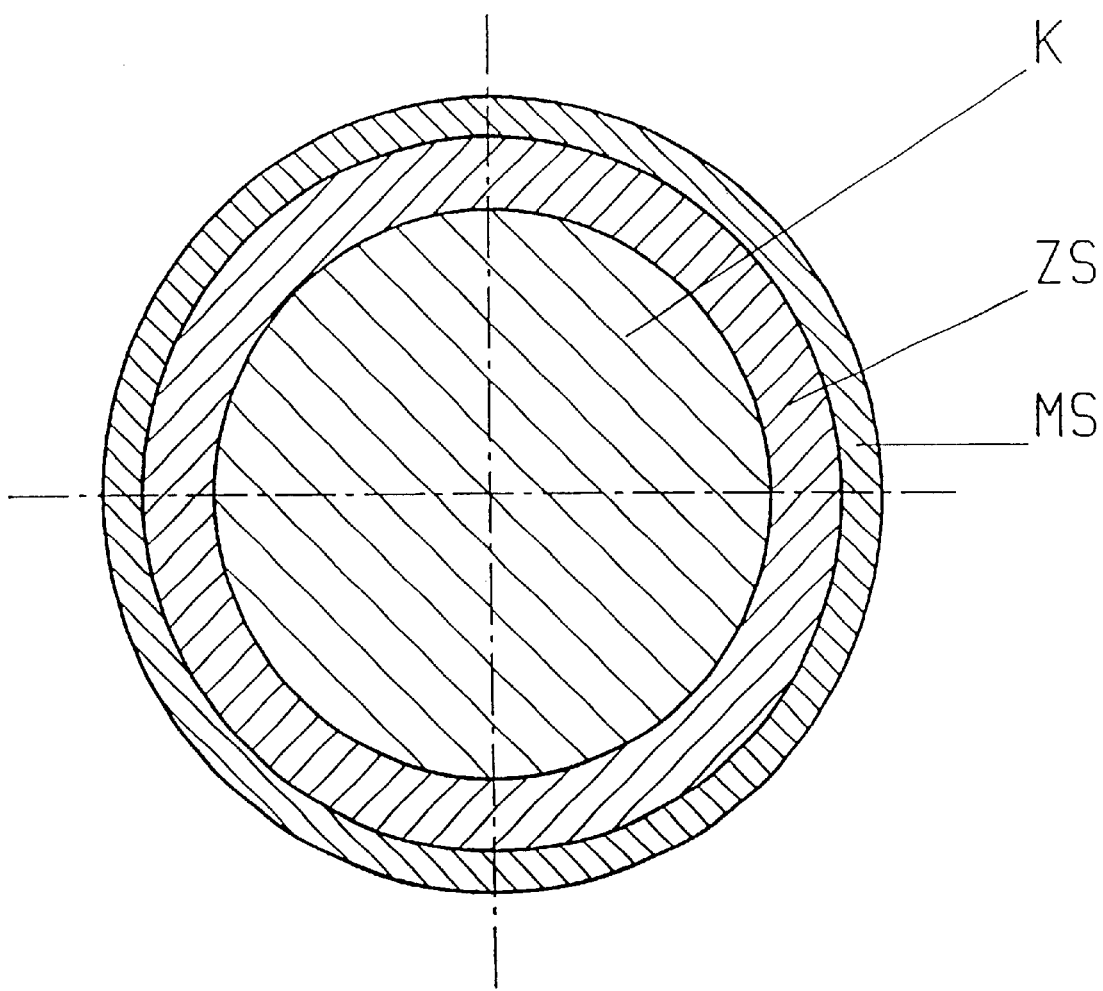

HIGH-STRENGTH EROSION ELECTRODE

FIELD OF THE INVENTION

The invention relates to a method for the manufacture of a wire electrode for the spark-erosion process and a wire electrode for this method, which consists of a core of steel, an intermediate layer of copper or a high copper-containing alloy, and an outer layer with at least 40% zinc.

BACKGROUND OF THE INVENTION

Wire electrodes, which are designed with multiple layers, which have a core of steel, an intermediate layer of copper arranged around the core, and an outer zinc-containing layer, are known, for example, from the DE-PS 29 06 245. All known wire electrodes, which are constructed with a steel core, do indeed have an increased strength compared with copper or brass electrodes, however, all of these erosion electrodes have the disadvantage that if they have comparatively high strengths, their electrical conductivity is very low and merely reaches 8 S·m/m$^2$. This comparatively high tensile strength is particularly advantageous for the cutting of high or thick workpieces or, however, also for the cutting of very small parts since high wire tensions are here demanded. However, these known wire electrodes have the disadvantage that their erosion performance is relatively low. In particular, in the case of cutting very small parts with erosion-wire diameters of up to 10 µm, high wire strengths are demanded in order to reduce deflection and vibration of the wire to a minimum. Tungsten or molybdenum wires have been used up to now for the cutting of very small parts with wire thicknesses of 100 µm and less, however, tungsten or molybdenum wires are extremely expensive to manufacture. Erosion wires with a steel core and a brass outer layer have been unable to be successful up to now for this purpose since they always, in comparison to tungsten wires, showed a lesser strength and a poorer erosion behaviour.

SUMMARY OF THE INVENTION

The basic purpose of the invention is to provide high-strength erosion electrodes with a core of steel of the abovementioned type and a method for their manufacture, which electrodes have strengths which are 1800 N/mm$^2$ and higher and, in addition, have a comparatively high conductivity of 10 S·m/mm$^2$ and more.

BRIEF DESCRIPTION OF THE DRAWING

The single drawing FIGURE illustrates cross-section of the inventive wire.

DETAILED DESCRIPTION

This purpose is attained by providing an erosion electrode with a core of steel, an intermediate layer of copper or a high copper-containing alloy and an outer layer with at least 40% zinc, wherein the steel core has a patented structure with a carbon content of 0.6 to 1 wt. %, which occupies an area of the core of 50 to 75% of the cross-sectional surface of the erosion electrode, wherein the intermediate layer has an area of 5 to 40% and the outer layer has an area of 10 to 30%, and wherein the zinc content of the outer layer lies between 40 and 60 wt. %. The purpose is also attained by providing a method for the manufacture of a high-strength erosion electrode comprising a core of steel, an intermediate layer of copper or a high copper-containing alloy, and an outer layer of an alloy containing at least 40% zinc, wherein a steel with a carbon content of 0.6 to 1 wt. % is used as the core, onto which is applied the intermediate layer of copper or a high copper-containing alloy, wherein an outer layer of zinc or a high zinc-containing alloy is applied onto the intermediate layer, wherein the wire, prior to a first intermediate annealing, is subjected to a diffusion annealing such that on the one hand the outer layer forms an alloy with a zinc content, the melting point of which is higher than the austenitization temperature required for the patenting of the steel core, and on the other hand the diffusion process is carried out so long that, taking into consideration one or rather several following patentings of the erosion wire, the outer layer maintains the desired composition and strength, whereby the erosion electrode is patented during each intermediate annealing.

Thus, an erosion wire of the invention has a steel core K with a carbon content of 0.6 to 1%, whereby a high copper-containing copper alloy is applied as an intermediate layer ZS onto said steel core. This intermediate layer is covered by an outer layer MS which, when the erosion wire is finished, consists of a zinc alloy, the zinc content of which lies between 40 and 60%. The condition for achieving the comparatively high conductivity of the erosion electrode with an equally high strength is that the core has a patented structure, consists advantageously of sorbite, whereby a further layer is arranged between the outer layer and the core, which further layer contains high amounts of copper, that is, it is only slightly alloyed. Silver in the form of the alloy CuAg1 has here proven to be particularly advantageous as the alloy element. Also a copper alloy with a small amount of zinc can be advantageously utilized for the intended purpose. An outer layer has been applied to this intermediate layer, which outer layer consists of a zinc alloy, in which the zinc content reaches at least 40% and may reach a maximum of 60%.

A wire electrode of the invention could be manufactured in such a manner that a sleeve out of a brass pipe or brass band is applied to a steel core enveloped with copper, and the composite is thereafter reduced by means of wire drawing. This type of manufacture becomes more problematic the higher the zinc content in the outer layer is supposed to be. A further method could consist of providing a copper-enveloped steel wire with a zinc-containing outer layer via a dipping method. The zinc content could here be adjusted at random. The difficulty with this method is to apply the outer layer with an even thickness over the circumference.

A very advantageous method for the manufacture of a wire electrode is that a steel core is enveloped with a copper layer, whereby the structure of the steel core should exist in a patented form. A zinc alloy is thereafter then applied to this copper intermediate layer, whereby in the simpliest case the outer layer consists of pure zinc. This is followed by a diffusion annealing, the duration of which is chosen in dependency of the diffusion temperature such that the entire outer layer forms a zinc alloy, the zinc content of which amounts to 60% at a maximum. The duration of the diffusion annealing is furthermore determined such that the demanded areas for the core wire, the intermediate layer and the outer layer adjust, whereby these areas of the three sections are not only important for the strength achieved in the final wire but also for its conductivity. A further decisive factor for the strength, however and, also for the conductivity of the erosion wire is that in the final wire the core consists of a patented structure, whereby the electrical conductivity and strength are equally optimized.

The wire, the core of which should already exist in the patented state is, after the diffusion annealing has occurred, reduced in its diameter by drawing.

The area of the core on the electrode should lie between 50 to 75% of the entire electrode. The area of the intermediate layer should lie between 5 and 40% and the area of the outer layer between 10 to 30% . If one furthermore meets the demand that the zinc content of the outer layer lies between 40 and 60% advantageously at slightly above 50% , then one obtains an electrode with a conductivity which lies between 10 and 18 S·m/mm$^2$, whereby at the same time strengths are obtained which lie between 1800 and 2500 N/mm$^2$. It must hereby be noted that the demand for high conductivity and high strength is in contrast, namely an inventive wire with a very high strength has a comparatively low electrical conductivity and vice versa. The wires of the invention can be drawn to a diameter of below 10 μm, namely, to diameters which are sufficiently small for the up to now known uses. It has thereby been found to be particularly advantageous that these wires with a thin diameter can easily replace the up to now used tungsten and molybdenum wires and are by comparison significantly less expensive to manufacture, show no aging, have lower raw-material costs, and moreover offer a higher safety in manufacture and have constant erosion characteristics. The achieved quality in manufacture is so great that the wire of the invention will practically not break down on the erosion machine, whereas the breakdown of the up to now utilized molybdenum or tungsten wire amounts to up to 50% .

The high strength is particularly advantageous in the case of erosion wires with diameters of above 100 Am when workpieces with a greater height are to be cut since high wire tensions are required here in order to keep bending and vibrations low.

An electrode of the invention is distinguished by a high conductivity and a comparatively high strength. Moreover, the cutting quality with a high exactness in contours is very good, whereby this precision is favored by the high wire tension based on the high strength of the wire.

The embodiments of the invention in which an exclusive property or privilege is claimed are defined as follows:

1. A method of manufacturing a high-strength erosion electrode having a steel core, an intermediate layer of copper or a high copper content-containing alloy and an outer layer of an alloy containing at least 40% zinc, said method comprising the steps of:

providing a steel core having a carbon content of from 0.6 to 1 wt. %;

applying an intermediate layer of copper or a high copper content-containing alloy onto the steel core;

applying an outer layer of zinc or a high zinc content-containing alloy onto the intermediate layer to form a wire electrode;

performing diffusion annealing on the wire electrode for a period of time sufficient to form the outer layer into a zinc-containing alloy having a melting point higher than the austenitization temperature required for patenting of the steel core; and performing intermediate annealing on the wire electrode under conditions sufficient to subject the wire electrode to a patenting treatment to form the high-strength erosion electrode.

2. The method of claim 1, comprising the steps of:

providing a patented steel wire with a copper intermediate layer as an initial wire;

applying a high zinc content-containing alloy outer layer onto the intermediate layer;

performing diffusion annealing on the wire to form a brass outer layer having a predetermined composition and strength;

deforming the wire to reduce the diameter thereof; and performing a patenting step after each deformation step until the wire reaches its final diameter.

3. An erosion electrode comprising a steel core, an intermediate layer of copper or a high copper content-containing alloy and an outer layer containing from 40–60 wt. % zinc, wherein said steel core has a patented structure, a carbon content of 0.6 to 1 wt. % and occupies an area of 50 to 75% of the cross-sectional area of the erosion electrode, the intermediate layer occupies an area of 5 to 40% of the cross-sectional area of the erosion electrode and the outer layer occupies an area of 10 to 30% of the cross-sectional area of the erosion electrode.

4. The method according to claim 2, wherein the outer layer after a first diffusion annealing step has a zinc content which does not exceed 60%.

5. The method according to claim 4, wherein the initial wire has a core diameter of 0.8 mm and a layer thickness of the intermediate layer of 0.1 mm, the outer layer applied onto the intermediate layer is 30 μm, the wire is then subjected to a diffusion annealing at 400° C. over 4 hours and is thereafter drawn to a diameter of approximately 0.4 mm, the erosion wire is thereafter patented and is then drawn under, if necessary, further patentings to its final diameter.

6. The erosion electrode according to claim 3, wherein the conductivity of the erosion electrode is at least 10 S·m/mm$^2$.

7. The erosion electrode according to claim 6, wherein the intermediate layer consists of copper with a small amount of silver.

8. The erosion electrode according to claim 7, wherein the intermediate layer consists of CuAg1.

9. The erosion electrode according to claim 8, wherein the strength of the erosion wire is at least 1800 N/mm$^2$.

10. The method according to claim 1, wherein the outer layer, after a first diffusion annealing step, has a zinc content which does not exceed 60%.

11. The method according to claim 2, wherein the initial wire has a core diameter of 0.8 mm and a layer thickness of the intermediate layer of 0.1 mm, the outer layer applied onto the intermediate layer is 30 μm thick, the wire is then subjected to a diffusion annealing at 400° C. over 4 hours, drawn to a diameter of approximately 0.4 mm, thereafter patented and then drawn under, if necessary, further patentings to its final diameter.

12. The erosion electrode according to claim 6, wherein the strength of the erosion wire is at least 1800 N/mm$^2$.

13. The erosion electrode according to claim 7, wherein the strength of the erosion wire is at least 1800 N/mm$^2$.

14. The erosion electrode according to claim 3, wherein the intermediate layer consists of copper with a small amount of silver.

15. The erosion electrode according to claim 14, wherein the strength of the erosion wire is at least 1800 N/mm$^2$.

16. The erosion electrode according to claim 14, wherein the intermediate layer consists of CuAg1.

17. The erosion electrode according to claim 16, wherein the strength of the erosion wire is at least 1800 N/mm$^2$.

18. The erosion electrode according to claim 3, wherein the strength of the erosion wire is at least 1800 N/mm$^2$.

* * * * *